United States Patent [19]

Petri et al.

[11] 4,032,433

[45] June 28, 1977

[54] HYDROREFINING ASPHALTENIC PETROLEUM CHARGE STOCKS

[75] Inventors: Larry W. Petri, Arlington Heights; John E. Conway, La Grange, both of Ill.

[73] Assignee: UOP Inc., Des Plaines, Ill.

[22] Filed: Apr. 30, 1976

[21] Appl. No.: 681,988

[52] U.S. Cl. .............................. 208/112; 208/213; 208/216; 252/477 R; 423/335

[51] Int. Cl.² ................ C10G 13/04; C10G 23/02; B01J 35/10

[58] Field of Search ................ 208/112, 109, 111; 252/477 R

[56] References Cited

UNITED STATES PATENTS

| | | | |
|---|---|---|---|
| 2,603,610 | 7/1952 | Amos et al. | 252/470 |
| 3,051,662 | 8/1962 | Pitzer et al. | 252/477 R |
| 3,162,607 | 12/1964 | Burbidge et al. | 252/477 R |
| 3,378,365 | 4/1968 | Bruns et al. | 75/20 |
| 3,467,602 | 9/1969 | Koester | 252/455 R |
| 3,679,605 | 7/1972 | Sanford et al. | 252/463 |
| 3,755,192 | 8/1973 | Rottig et al. | 252/428 |
| 3,804,781 | 4/1974 | Colgan | 252/463 |
| 3,853,789 | 12/1974 | Warthen et al. | 252/463 |

*Primary Examiner*—Delbert E. Gantz
*Assistant Examiner*—G. E. Schmitkons
*Attorney, Agent, or Firm*—James R. Hoatson, Jr.; Thomas K. McBride; William H. Page, II

[57] ABSTRACT

Hydrorefining of petroleum stocks containing asphaltenes, sulfur and nitrogen with an extruded refractory inorganic oxide catalyst support wherein said support is prepared by admixing a peptizing agent, a surfactant, and a water-insoluble particulate organic polymer having a particle size of from about 1 to about 200 microns with a powdered refractory inorganic oxide and extruding the resulting mixture.

9 Claims, No Drawings

HYDROREFINING ASPHALTENIC PETROLEUM CHARGE STOCKS

The invention described herein relates to the hydrorefining of asphaltenic petroleum charge stocks including crude oils and other heavy hydrocarbon fractions and/or distillates derived therefrom, for the primary purpose of reducing the concentrations of contaminating influences contained therein. More particularly, the present invention is directed toward a catalytic process for hydrorefining an asphaltene-containing hydrocarbon charge stock, which charge stock is further contaminated by the inclusion of sulfurous and/or nitrogenous compounds.

Petroleum crude oils, especially topped or reduced crude oils, as well as other heavy hydrocarbon fractions and/or distillates, including black oils, vis-breaker effluent, atmospheric and vacuum tower bottoms product, tar sand oils, etc., contain various non-metallic and metallic impurities which detrimentally affect various processes to which such heavy hydrocarbon fractions may be subjected. Included among the non-metallic impurities are large quantities of nitrogen, sulfur, and oxygen, usually found to exist as heteratomic compounds. Nitrogen is particularly undesirable since it effectively poisons various catalytic composites which may be employed in subsequent processes for the conversion of these petroleum fractions. Nitrogenous and sulfurous compounds are objectionable since the combustion of various fuels containing these impurities causes the release of nitrogen oxides and sulfurous oxides which are noxious, corrosive, and present, therefore, a serious problem with respect to pollution of the atmosphere.

In addition, petroleum charge stocks contain a high-boiling fraction comprising high molecular weight asphaltenic compounds. These are non-distillate, oil-insoluble coke precursors which may contain sulfur, nitrogen, oxygen, and a variety of metals. They are generally colloidally dispersed within a petroleum crude oil, vacuum or tower bottoms product, and, when subjected to various reactions at elevated temperatures, have the tendency to polymerize, thereby making conversion thereof to more valuable distillable hydrocarbons extremely difficult.

Of the metallic contaminants, those containing nickel and vanadium are found to be most common, and generally occur in the form of thermally stable, organometallic complexes, such as metallic porphyrins and various derivatives thereof. A considerable quantity of the organo-metallic complexes are associated with asphaltenes and become concentrated in a residual fraction; some of the organo-metallic complexes are volatile, oil-soluble, and are, therefore, carried over into lighter distillate fractions. A reduction in the concentration of the organo-metallic complexes is not easily achieved. With respect to the hydrogenation, hydrorefining, hydrodesulfurization and/or hydrocracking of topped or reduced crude oils, atmospheric tower bottoms, and/or vacuum tower bottom product, containing excessive quantities of asphaltenic compounds, some of which are linked with the organo-metallic complexes, the primary difficulty resides in carbon formation due to the asphaltenic compounds, such carbon formation being favored as a result of the insolubility of these asphaltenic compounds. A gummy carbonaceous deposit is formed and causes the catalyst particles to become bound together, thereby restricting the flow of reactants through the catalyst bed. Furthermore, the presence of asphaltenes with the capability of the catalyst to effect a reduction in sulfurous and nitrogenous compounds.

The desirablity of removing the foregoing described contaminating influences is well-known within the art of petroleum refining. Also, those skilled in the art recognize the value of asphaltenic hydrorefining catalysts having particular pore size, pore volume and pore distribution. This invention is particularly directed to a method of improving the macropore volume of extruded refractory inorganic oxide particles for use as a catalyst support or carrier material.

Catalysts comprising the support or carrier material manufactured in accordance with the method of this invention are particularly useful in the hydrorefining of asphaltenic hydrocarbons.

In the catalytic hydrorefining, especially hydrodesulfurization, of petroleum crude and residual oils, it has been recognized that catalysts having essentially only micropores, that is, pores of less than 117 Angstroms in diameter as measured by the BET nitrogen absorption method, are more readily deactivated than are catalysts containing larger pores, that is, pores of macropore dimension. This has attributed to the relatively rapid accumulation of metallic contaminants at the restricted entrance offered by the micropores, and to the resulting loss in surface area so essential to catalyst activity. On the other hand, catalysts having an increasing number of macropores are substantially less prone to plugging, and thus to the deactivating influence of said metallic contaminants.

It is therefore an object of this invention to present a method of improving the macropore volume of an extruded refractory inorganic oxide for use as a catalyst support carrier material.

In one of its broad aspects, the present invention embodies a method of improving the macropore volume of extruded refractory inorganic oxide particles which comprises admixing a peptizing agent, a surfactant and a water-insoluble, particulate organic polymer with a powdered refractory inorganic oxide, said organic polymer being characterized by a particle size of from about 1 to about 200 microns; extruding the resulting mixture; and drying the calcining the extrudate product as a temperature effective to decompose said organic polymer.

One of the more specific embodiments of this invention concerns a method of improving the macropore volume of extruded alumina particles which comprises admixing water, a surfactant and a water-insoluble organic polymer with a powdered alpha-aluminum monohydrate, said organic polymer being characterized by a particle size of from about 1 to about 200 microns; extruding the resulting mixture; and drying and calcining the extrudate product at a temperature of from about 325° to about 850° C.

A still more specific embodiment relates to the method of improving the macropore volume of extruded alumina particles which comprises admixing water, a linear primary alcohol polyether, and a substantially pure cellulose with a powdered alpha-aluminum monohydrate, said cellulose being characterized by a particle size of from about 1 to 200 microns; extruding the resulting mixture; and drying and calcining the extrudate product at a temperature from about 325° to about 85° C.

Another embodiment relates to a process for hydrorefining an asphaltenic hydrocarbonaceous charge stock containing at least one contaminant from the group of sulfurous compounds, and nitrogenous compounds, which process comprises reacting said charge stock with hydrogen at hydrorefining conditions including a pressure above 1000 psig. and a temperature selected to convert sulfurous and nitrogenous compounds into hydrogen sulfide, ammonia and hydrocarbons, and at least a portion of said charge stock into lower-boiling liquid hydrocarbons, and in contact with a catalyst having a carrier material prepared by a method which comprises: (a) admixing a peptizing agent, a surfactant and a waterinsoluble, particulate organic polymer with a powdered refractory inorganic oxide, said organic polymer being characterized by a particle size of from about 1 to about 200 microns; (b) extruding the resulting mixture; and (c) drying and calcining the extrudate product at a temperature effective to decompose said organic polymer.

Other objects and embodiments of this invention will become apparent with the following detailed specification.

Pursuant to the method of this invention, a powdered refractory inorganic oxide is first admixed with a peptizing agent, a surfactant and a water-insoluble organic polymer. It is a convenient and conventional practice to further include a binder-lubricant as an extrusion aid, typically starch, polyvinyl alcohol, methycellulose, graphite, or the like, and suitably in an amount, based on the weight of the refractory inorganic oxide of from about 0.01 to about 5 wt. %.

The powdered refractory inorganic oxide herein comtemplated is preferably composed of particles having an average diameter of less than about 105 microns, for example, particles which are recoverable through a 105 micron microsieve. The refractory inorganic oxide may be a naturally occurring or a synthetically prepared refractory inorganic oxide. Suitable refractory inorganic oxides include such as alumina, silica, zirconia, thoria, boria, and the like, as well as composites or combinations thereof, for example, alumina-silica, alumina-zirconia, alumina-boria, etc. Alumina is a preferred refractory inorganic oxide, particularly with respect to the hydrorefining of crude and residual oils as herein contemplated. The powdered alumina employed in the practice of this invention may be an activated alumina such as has been thermally treated at a temperature in the 400°–800° C. range with the elimination of at least a portion of the chemically and/or physically combined water or hydroxyl groups commonly associated therewith. Or the alumina may be any of the various hydrous aluminum oxides or alumina gels such as boehmite, gibbsite, bayerite, and the like. An alpha-alumina monohydrate of the boehmite structure, such as is recovered as a by-product in the manufacture of alcohol through the hydrolysis of an aluminum alcoholate or alkoxide, is preferably employed.

Peptizing agents useful in the present invention are those commonly described in the art for reverting gels to their sol form. Thus, the peptizing agent may be water, or a weak acid such as formic acid, acetic acid, propionic acid, or the like. Stronger acids such as sulfurous acid, hydrochloric acid, nitric acid, etc., substantially obviate the beneficial effect of the surfactant and are not suitable for use herein. Water is a preferred peptizing agent. In any case, only sufficient peptizing agent is employed to revert the gel to a pliable plastic mass, the amount being insufficient to completely revert the gel to a sol. The peptizing agent may be combined with the powdered refractory inorganic oxide together with the surfactant and the organic polymer by placing the refractory inorganic oxide in a suitable mechanical stirrer and adding the peptizing agent, the surfactant and the organic polymer thereto during the mixing operation.

Various surfactants are useful in the method of this invention including anionic, cationic, and nonionic surfactants, provided they leave no residue harmful to the catalyst product in its intended use. Suitable surfactants include $C_3$–$C_{12}$ alcohols, linear primary alcohol polyethers, dimethylsilicones, silicone polyether copolymers, and also the various and well-known polyoxyethylene alkylphenols, polyoxyethylene esters of fatty acids, polyoxyethylene alcohols, polyoxyethylene mercaptans, polyoxyethylene alkylamines, polyoxythylene alkylamides, and the like. A linear primary alcohol polyether, available under the tradename Antarox BL-240, is a particularly suitable surfactant. Preferably, the surfactant is utilized to the extent of from about 0.1 to about 10 wt. % of the refractory inorganic oxide.

The particulate, water-insoluble organic polymer employed herein in conjunction with the aforesaid surfactant is characterized by a particle size of from about 1 to about 200 microns. For example, a commercially available low density micropolyethylene powder with a particle size in the 2–10 micron range, is a suitable organic polymer, for use herein. The organic polymer is preferably a sustantially pure cellulose in the 30,000–50,000 molecular weight range. A particularly preferred organic polymer is described as a highly purified microcrystalline cellulose having an average particle size in the 10–50 micron range, and available under the tradename Avicel.

The extrusion operation is suitably effected with commercial extrusion apparatus. For example, the dough is continuously processed through a cylinder by means of a rotating screw and pressured through a die comprising a multitude of openings of an appropriate diameter to produce an extruded product of desired size. The dough is continuously pressured through the die at a pressure of at least about 150 psig. and cut into particles of desired length by means of a rotating knife. After the dough has been extruded, the extrudate particles are dried and calcined. Drying is usually effected by temperatures up to about 200° C. for a period of from about 1 to about 24 hours. Calcination is preferably in an oxidizing atmosphere, such as air, at a temperature from about 325° to about 850° C. and is suitably accomplished over a 2 to 4 hour period.

Hydrorefining catalysts typically contain a catalytic components a Group VIB metal and a Group VIII metal, and/or the oxides and sulfides thereof. Of the Group VIB metals, i.e., molybdenum, tungsten and chromium, molybdenum is generally preferred, and other Group VIII metals, i.e., iron, nickel, cobalt, platinum, palladium, rhodium, ruthenium, iridium, and osmium, nickel is generally preferred. Said components for example molybdenum and nickel, or a suitable precursor compound thereof such as molybdic acid and nickel nitrate, can be composed with the extrudate particles by impregnation and/or ion-exchange techniques. Said components can be composited with a refractory inorganic oxide starting material prior to blending the inorganic oxide with the other ingredients of the extrusion mix. Or an aqueous solution of soluble compound of said catalytic components can be combined with or serve as said peptizing agent and thus composited with the extrudate particles. Alternatively, said catalytic components can be composited with the finished extrudate particles by impregnation and/or ion-exchange techniques either before or after the extrudate particles have been dried and calcined. However, in the event that the catalytic components or a precursor compound thereof are added to the calcined extrudate particles, the resulting composite will invariably require further calcining.

The following examples are presented in illustration of one preferred embodiment of this invention and are not intended as an undue limitation on the generally broad scope of the invention as set out in the appended claims.

EXAMPLE I

In the manufacture of extruded alumina particles according to the method of this invention, a finely powdered alpha-alumina monohydrate was dry-mixed with 2 wt. % methylcellulose as a binder-lubricant, and with about 2.5 wt. % Avicel — described as a water-insoluble, highly purified form of cellulose having a molecular weight of 30,000–50,000 and a particle size of 1–100 microns. The alpha-alumina monohydrate employed was a 50/50 blend of Catapal S and Kaiser LT. A sufficient amount of water was added to the mixture to form a smooth extrudable dough, the water containing about 2.5 wt. % Antarox BL-240 based on the weight of the alpha-alumina monohydrate. The Antarox BL-240, utilized as a detergent or surfactant, is a linear primary alcohol polyether. The mixture was mulled for about 30 minutes and thereafter extruded through a 1/32 inch die under 150 psig. pressure. The extrudate was dried and calcined, first for one hour at 345° C., and then for 2 hours at 595° C. The product is hereinafter referred to as Catalyst A.

EXAMPLE II

In illustration of the improvement in macropore volume derived from the practice of this invention, a Catalyst B was prepared substantially as described, but eliminating the surfactant from the preparation. Thus, the finely powdered alpha-alumina monohydrate was dry-mixed with 2 wt. % methylcellulose and 2.5 wt. % Avicel. A sufficient amount of water was added to the mixture to form a smooth extrudable dough. The mixture was mulled for about 30 minutes and thereafter extruded through a 1/32 inch die under 150 psig. pressure. The extrudate was dried and calcined, first for 1 hour at 345° C. and then for 2 hours at 595° C., all substantially in accordance with the preparation of Example I.

EXAMPLE III

In this example, a Catalyst C was prepared in accordance with the method of Example I except that the Avicel ingredient was omitted from the preparation. In this example, the finely powdered alpha-alumina monohydrate was dry-mixed with 2 wt. % methylcellulose based on the weight of the alumina. A sufficient amount of water was added to the mixture to form a smooth extrudable dough, the water containing about 2.5 wt. % Antarox BL-240 based on the weight of the alumina. Again, the mixture was mulled for approximately 30 minutes and then extruded to a 1/32 inch die at a pressure of 150 psig. The extrudate was dried, calcined at 345° C. for 1 hour and then at 595° C. for 2 hours pursuant to the method of Example I.

EXAMPLE IV

Catalyst D was prepared without the surfactant and without the Avicel, but otherwise substantially as described with respect to Catalyst A. Thus, the finely divided alpha-alumina monohydrate was dry-mixed with 2 wt % methylcellulose, and sufficient water added thereto to form a smooth extrudable dough. The mixture was mulled for about 30 minutes and extruded through a 1/32 inch die at a pressure of 150 psig. The extrudate was dried, calcined for 1 hour at 345° C. and for 2 hours at 595° C. as in the case of the previous examples.

The catalysts, A, B, C and D, were analyzed to determine their physical properties. The macropore volume, that is, the pore volume associated with pores in excess of 117 Angstroms, was determined with a mercury porosimeter. The results are tabulated in Table I below.

TABLE I

| CATALYST | A | B | C | D |
|---|---|---|---|---|
| Average Bulk Density, g/cc | .508 | .502 | .494 | .476 |
| Surface Area, m²/g | 221 | 296 | 345 | 280 |
| Pore Diameter, A | 110 | 82 | 79 | 90 |
| Pore Volume (micro) cc/g | .61 | .61 | .68 | .63 |
| Pore Volume (macro) cc/g | | | | |
| 117–200 A | .1375 | .0657 | .0819 | .0657 |
| 200–300 | .0279 | .0094 | .0117 | .0064 |
| 300–500 | .0164 | .0152 | .0112 | .0071 |
| 500–1000 | .0139 | .0114 | .0086 | .003 |
| 1000–1750 | .0193 | .0204 | .0161 | .0017 |
| 1750–3500 | .0308 | .0110 | .0034 | .0029 |
| 3500–17,500 | .0482 | .006 | .0078 | .0114 |
| 17,500–58,333 | .0039 | .002 | .0104 | — |
| Total Macropore Volume in Pores≥300 A, cc/g | .1325 | .0660 | .0575 | .0261 |
| Total Macropore Volume in Pores≥1000 A, cc/g | .1022 | .0394 | .0377 | .0160 |
| Total Macropore Volume, cc/g | .2979 | .1411 | .1511 | .0982 |

Although the surfactant and the organic polymer each in themselves exhibit a substantial influence on the macropore volume, the data presented in Table I clearly demonstrates the synergistic effect of the surfactant-organic polymer combination, and this effect is apparent not only with respect to the total macropore volume, but also with respect to the distribution thereof in favor of pores in the 300+ Angstrom range, and particularly pores in the 1000+ Angstrom range.

EXAMPLE V

A black oil desulfurization catalyst was prepared utilizing an extruded alumina support manufactured according to the method of this invention as in Example I. The finished desulfurization catalyst contained 2.5 wt. % cobalt and 8 wt. % molybdenum. A Kuwait reduced crude feed stock which had previously been 83% desulfurized and which had the properties presented in Table II

TABLE II

| KUWAIT REDUCED CRUDE FEEDSTOCK PROPERTIES | |
|---|---|
| Total Sulfur*, wt. % | 0.68 |
| Gravity, °API at 60° F. | 22.3 |
| Heptane Insolubles, wt. % | 1.59 |
| Sulfur in Heptane Insolubles, wt. % | 7.35 |
| % Total Sulfur in Heptane Insolubles, % | 17.2 |
| Sulfur in D-1160 Bottoms, wt. % | 2.42 |
| Total Sulfur in D-1160 Bottoms, wt. % | 0.530 |
| % Total Sulfur in D-1160 Bottoms, % | 82 |

TABLE II-continued

KUWAIT REDUCED CRUDE FEEDSTOCK PROPERTIES

| Metals | |
|---|---|
| Vanadium, ppm. | 18 |
| Nickel, ppm | 9 |
| Iron, ppm. | 4 |
| D-1160 Distillation | |
| IBP (° F.) | 515 |
| 10% | 680 |
| 30% | 790 |
| 50% | 890 |
| 70% | 1045 |
| EP | 1080 |
| % Over | 77 |

*Represents 83% desulfurization was passed over the catalyst immediately hereinabove described at a pressure of 2000 psig., a liquid hourly spaced velocity of 0.5 hr.$^{-1}$, a maximum catalyst temperature of 710° F., and a hydrogen circulation rate of 10,000 SCFB. The product contained 0.11 wt. % sulfur and the analysis of the product are presented in Table III.

TABLE III

KUWAIT REDUCED CRUDE PRODUCT PROPERTIES

| | |
|---|---|
| Total Sulfur, wt. % | 0.11 |
| Gravity, °API at 60° F. | 25.6 |
| Heptane Insolubles, wt. % | 0.58 |
| Sulfur in Heptane Insolubles, wt. % | 7.35 |
| Sulfur in D-1160 Bottoms, wt. % | 0.7 |
| Metals | |
| Vanadium, ppm. | 5 |
| Nickel, ppm. | 2 |
| Iron, ppm. | 4 |
| D-1160 Distillation | |
| IBP (° F.) | 468 |
| 10% | 652 |
| 30% | 762 |
| 50% | 867 |
| 70% | 998 |
| EP | 1108 |
| % Over | 86.1 |

The foregoing specification and examples clearly illustrate the improvement encompassed by the present invention and the benefits to be afforded a process for the production of a low-sulfur black oil from a sulfur-containing, high-boiling hydrocarbon charge stock.

We claim as our invention:

1. A process for hydrorefining an asphaltenic hydrocarbonaceous charge stock containing at least one contaminant from the group of sulfurous compounds, and nitrogenous compounds, which process comprises reacting said charge stock with hydrogen at hydrorefining conditions including a pressure above about 1000 psig. and a temperature selected to convert sulfurous and nitrogenous compounds into hydrogen sulfide, ammonia and hydrocarbons, and at least a portion of said charge stock into lower-boiling liquid hydrocarbons, and in contact with a catalyst having a carrier material prepared by a method which comprises:
   a. admixing a peptizing agent, a surfactant and a water-insoluble, particulate organic polymer with a powdered refractory inorganic oxide, said organic polymer being characterized by a particle size of from about 1 to about 200 microns;
   b. extruding the resulting mixture; and,
   c. drying and calcining the extrudate product at a temperature effective to decompose said organic polymer.

2. The process of claim 1 further characterized with respect to step (a) in that said surfactant is employed in an amount equivalent to at least about 0.1 wt. % based on the weight of the refractory inorganic oxide employed therein.

3. The process of claim 1 further characterized with respect to step (a) in that said surfactant is employed in an amount equivalent to from about 0.1 to about 10 wt. % based on the weight of the refractory inorganic oxide employed therein.

4. The process of claim 1 further characterized with respect to step (a) in that organic polymer is employed in an amount equivalent to from about 0.5 to about 5 wt. % based on the weight of the refractory inorganic oxide employed therein.

5. The process of claim 1 further characterized with respect to step (a) in that said refractory inorganic oxide is an alumina.

6. The process of claim 1 further characterized with respect to step (a) in that said surfactant is a linear primary alcohol polyether.

7. The process of claim 1 further characterized with respect to step (a) in that said organic polymer is a cellulose with a molecular weight from about 30,000 to about 50,000.

8. The process of claim 1 further characterized with respect to step (a) in that said organic polymer is substantially pure cellulose.

9. The process of claim 1 further characterized with respect to step (c) in that said extrudate product is dried and calcined at a temperature of from about 325° to about 850° C.

* * * * *